United States Patent [19]

Hashimoto et al.

[11] 4,131,601

[45] Dec. 26, 1978

[54] PROCESS FOR THE PREPARATION OF POLYESTERS

[75] Inventors: Satoshi Hashimoto, Matsuyama; Nobuya Okumura, Ehime; Kiyoshi Kazama, Matsuyama, all of Japan

[73] Assignee: Teijin Limited, Osaka, Japan

[21] Appl. No.: 839,464

[22] Filed: Oct. 4, 1977

[30] Foreign Application Priority Data

Oct. 5, 1976 [JP] Japan ................................ 51-119007

[51] Int. Cl.$^2$ ............................................ C08G 63/14
[52] U.S. Cl. ...................................... 528/279; 528/308
[58] Field of Search ...................................... 260/75 R

[56] References Cited

U.S. PATENT DOCUMENTS

| | | | |
|---|---|---|---|
| 3,326,965 | 6/1967 | Schultheis et al. | 260/75 R X |
| 3,346,541 | 10/1967 | Davies et al. | 260/75 R |
| 3,444,139 | 5/1969 | Jeurissen et al. | 260/75 R |
| 3,951,886 | 4/1976 | Miyake et al. | 260/75 R X |

FOREIGN PATENT DOCUMENTS

851061  10/1960  United Kingdom .................. 260/75 R

*Primary Examiner*—Lucille M. Phynes
*Attorney, Agent, or Firm*—Sughrue, Rothwell, Mion, Zinn and Macpeak

[57] ABSTRACT

A process for the preparation of substantially linear, highly polymerized polyesters by polycondensing a glycol ester of an aromatic dicarboxylic acid and/or a low molecular weight condensate thereof, the process being characterized by using as a polycondensation catalyst a preformed titanate compound obtained by reacting a titanic acid ester represented by the formula $Ti(OR)_4$, where R is an alkyl group having from 1 to 5 carbon atoms, with an aromatic acid selected from the group consisting of trimellitic acid, trimellitic anhydride, hemimellitic acid, hemimellitic anhydride or a mixture of one or more thereof at a molar ratio of from about 0.5 to about 2.5 mols of the aromatic acid per 1 mol of the titanic acid ester, to thereby form polyesters which have a high softening point and good color tone.

5 Claims, No Drawings

PROCESS FOR THE PREPARATION OF POLYESTERS

BACKGROUND OF THE INVENTION

1. Field of the Invention

This invention relates to a process for the preparation of polyesters, in particular, to a process for the preparation of substantially linear, highly polymerized aromatic polyesters having a high softening point and good color tone.

2. Description of the Prior Art

Polyesters obtained by reacting an aromatic dicarboxylic acid with a glycol have excellent mechanical, physical and chemical properties, and hence are widely used for fiber, film and other moulding materials. Among such polyesters, polyesters obtained by reacting an acid component consisting mainly of terephthalic acid with a glycol component selected from the group consisting of ethylene glycol, tetramethylene glycol, hexamethylene glycol and cyclohexane-1,4-dimethanol are especially important.

In manufacturing the aforesaid polyesters—e.g., polyethylene terephthalate, conventional processing consists of heating the ethylene glycol ester of terephthalic acid and/or a low molecular weight condensate thereof under reduced pressure to effect polycondensation. In carrying out the polycondensation reaction on a commercial scale, catalysts are used to accelerate reaction. The rate of polycondensation and the qualities of the resulting polyester are greatly influenced by the kind(s) of catalyst(s) used.

Titanium compounds are known as excellent catalysts for the above-described polycondensation reaction.

For example, U.S. Pat. No. 2,822,348, Haslam, issued Feb. 4, 1958, discloses tetraisopropyltitanate, and British patent specification No. 793,111 to I.C.I. Limited, published Apr. 9, 1958, discloses an organic titanate, such as tetramethyl titanate and tetrabutyl titanate as a catalyst in the polycondensation reaction.

Although titanium compounds result in a very rapid rate of polycondensation, they also result in the formation of polyesters having a distinctly yellow color and provide polyesters with a decreased softening point. Methods have also been proposed to avoid the disadvantage of yellowness in polyesters formed as described.

For example, British Pat. No. 949,085 to I.C.I. Limited, published Feb. 12, 1964, discloses the use of a catalyst system which is the combination of a germanium compound (such as germanium tetraethoxide) and a titanium compound (such as titanium tetraisopropoxide or titanium tetrabutoxide) whereby the disadvantage of yellowness in the resulting polyester is considerably reduced. However, the rate of polycondensation is also reduced as compared to the use of a titanium compound alone. Further, this catalyst system is difficult to store for extended times because titanium compounds, such as titanium tetraisopropoxide or titanium tetrabutoxide, easily lose catalytic activity in the presence of a small amount of water.

British Pat. No. 851,061 to Goodyear Tire & Rubber Co., published Oct. 12, 1960, discloses the use of preformed organic titanate compounds formed by the rection of titanic acid esters with polyhydroxy compounds, such as ethylene glycol lor tetramethylene glycol, polycarboxylic compounds, such as maleic acid, phthalic acid and trimesic acid, or hydroxy carboxylic compounds, such as lactic acid and hydroxy benzoic acid. In the preparation of polyesters, these preformed organic titanate compounds accelerate the rate of polymerization and permit the formation of polymers of high molecular weight. However, as a result of experiments performed by the present inventors, it was found that the preformed organic titanate compounds disclosed in this British patent do not fully overcome the disadvantage of yellowness of the obtained polyesters so as to provide a color tone suitable for commercial use. In addition, for example, the preformed organic titanate compound derived from phthalic acid does not sufficiently accelerate the rate of polymerization. Finally, it is difficult to uniformly react trimesic acid (benzene-1,3,5-tricarboxylic acid) with a titanic acid ester.

SUMMARY OF THE INVENTION

It has now been surprisingly found that if a preformed titanate compound obtained by reacting a titanic acid ester with an aromatic tricarboxylic acid having the capacity to form an anhydride is used as a catalyst in the polycondensation of an aromatic dicarboxylic acid with a glycol to form a polyester, the above-mentioned disadvantages of the prior art can be substantially overcome.

It is, therefore, one object of the present invention to provide a process for the preparation of substantially linear, highly polymerized polyesters having a high softening point and good color tone.

It is another object of the present invention to provide a process for the preparation of polyesters using a polycondensation catalyst which is easily obtained and storable for extended periods of time without degradation.

The above-mentioned objects are attained by the process for the preparation of polyesters in accordance with the present invention, which comprises polycondensing a glycol ester of an aromatic dicarboxylic acid and/or a low molecular weight condensate thereof while removing glycol therefrom in the presence of a polycondensation catalyst which is preformed titanate compound obtained by reacting a titanic acid ester represented by the formula $Ti(OR)_4$, where R is an alkyl group having from 1 to 5 carbon atoms, with an aromatic acid selected from the group consisting of trimellitic acid (benzene-1,2,4-tricarboxylic acid), trimellitic anhydride, hemimellitic acid (benzene-1,2,3-tricarboxylic acid), hemimellitic anhydride or a mixture of one or more thereof.

DESCRIPTION OF THE PREFERRED EMBODIMENTS

As the aromatic dicarboxylic acid used in the present invention, there can be mentioned terephthalic acid, isophthalic acid, naphthalene-2,6-dicarboxylic acid, diphenyl-4,4'-dicarboxylic acid, diphenylsulfone-4,4'-dicarboxylic acid, diphenylmethane-4,4'-dicarboxylic acid, diphenylether-4,4'-dicarboxylic acid and diphenoxy-ethane-4,4'-dicarboxylic acid. Terephthalic acid is particularly preferable. The aromatic dicarboxylic acid may be substituted for by aliphatic dicarboxylic acids, such as sebacic acid, adipic acid and oxalic acid, or hydroxy carboxylic acids, such as p-(beta hydroxyethyl) benzoic acid, in an amount of about 10 mol% or less based on the amount of the aromatic dicarboxylic acid.

As the glycol used in the present invention, there can be aliphatic glycols, such as ethylene glycol, trimethylene glycol and tetramethylene glycol, and alicyclic dihydric alcohols, such as cyclohexane-1,4-dimethanol. Among these glycols, ethylene glycol is preferable, which may also be used in the form of its anhydride—i.e., ethylene oxide.

Preparation of the glycol ester of the aromatic dicarboxylic acid or a low molecular weight condensate thereof (the polymerization degree being from about 2 to about 10) can be accomplished by a direct esterification reaction between the aromatic dicarboxylic acid and the glycol, by an ester-exchange reaction between a lower alkyl (1–4 carbon atoms) or phenyl ester of the aromatic dicarboxylic acid and the glycol, or by reaction between the aromatic dicarboxylic acid and an ester-forming derivative of the glycol, such as 1,2-epoxide of the glycol.

The reaction of forming a glycol ester of the aromatic dicarboxylic acid or a low molecular weight condensate thereof can be conducted in the presence of an esterification catalyst or an ester-exchange catalyst. As such catalysts, for example, there are lithium compounds, such as lithium acetate, sodium compounds, such as sodium methylate, magnesium compounds, such as magnesium acetate, calcium compounds, such as calcium acetate, cobalt compounds, such as cobalt acetate and cobalt dichloride, manganese compounds, such as manganese acetate tetrahydrate, and zinc compounds, such as zinc acetate. A titanate compound obtained by reacting a titanic acid ester with an aromatic acid which is included within the polycondensation catalysts of the present invention is preferably used as the ester-exchange catalyst.

The polycondensation catalyst which is used in the present invention is a preformed titanate compound obtained by reacting a titanic acid ester expressed by the formula $Ti(OR)_4$, where R is an alkyl group having from 1 to 5 carbon atoms, with an aromatic tricarboxylic acid having the capacity to form an anhydride. As the titanic acid ester of the present invention, there may be illustrated tetramethyl titanate, tetraethyl titanate, tetrapropyl titanate, tetraisopropyl titanate or the tetrabutyl titanates (tetra-n-butyl titanate, tetra-iso-butyl titanate tetra-sec-butyl titanate and tetra-tert-butyl titanate). Particularly, tetrapropyl titanate, tetraisopropyl titanate and the tetrabutyl titanates are preferable.

The aromatic acid of the present invention must be selected from the group consisting of trimellitic acid, trimellitic anhydride, hemimellitic acid, hemimellitic anhydride and mixtures of one or more thereof, the acids, of course, being aromatic tricarboxylic acids, which have the capacity to form anhydrides.

The titanate compound of the present invention may be conveniently prepared by adding the titanic acid ester to an organic solvent solution of the aromatic acid having an aromatic acid concentration within a range of from 0.1 to 5% by weight of the solution, and heating the obtained mixture at a temperature of from about 50 to about 180° C. for from about 30 to about 90 minutes at normal atmospheric pressure to remove the alcohol formed—i.e., ROH, to the extent of replacing an average of from 1 to 4, preferably from 1 to 3 of the substituent groups of the original titanic acid ester.

Any organic solvent can be used as a solvent for the reaction, provided that it dissolves a part or all of the aromatic acid and is insert to both the titanic acid ester and the aromatic acid. Particularly, ethanol, benzene and ethylene glycol are preferable.

When ethanol or benzene is used as a solvent, the reaction temperature can be from about 50 to about 80° C. or from about 60 to about 80° C., and the reaction time can be from about 40 to about 90 minutes or from about 30 to about 90 minutes, respectively. The formed titanate compound is precipitated by adding a large amount of acetone to the reaction mixture.

When ethylene glycol is used as a solvent, the reaction temperature may be from about 100 to about 180° C. and the reaction time may be from about 30 to about 60 minutes. The resulting ethylene glycol solution of the formed titanate compound may be used in that condition as the polycondensation catalyst of the present invention. The ethylene glycol solution of the titanate compound can be used at a concentration of from about 0.5 to about 3%, by weight (calculated in terms of titanium atoms).

The titanic acid ester and aromatic acid must be reacted in a molar ratio of from about 0.5 to about 2.5 mols, preferably from 1 to 2 mols, of the aromatic acid based per 1 mol of the titanic acid ester. When too much titanic acid ester is used, the color tone of the obtained polyester tends to be bad and the softening point tents to be low. On the other hand, when too little titanic acid ester is used, it tends to be difficult to complete the polycondensation reaction.

The amount of the polycondensation catalyst used in the present invention is not particularly critical. The catalyst is usually used in an amount of from 0.001 to 0.05, preferably from 0.005 to 0.02 mol% (calculated in terms of titanium atoms) based on the aromatic dicarboxylic acid component (which includes other dicarboxylic acids which may be partially substituted therefor) used for preparing the glycol ester of the aromatic dicarboxylic acid or the low molecular weight condensate thereof. When the amount of the catalyst is too small, the rate of polycondensation reaction is not sufficient, while when the amount of the catalyst is too high, the color of the obtained polyesters tends to be yellow.

In this invention, the polycondensation catalyst is preferably added to a glycol ester of the aromatic dicarboxylic acid and/or a low molecular weight condensate thereof at a stage before or immediately after the initiation of the polycondensation reaction. When the polycondensation catalyst in the present invention is also used as a catalyst in the ester-exchange reaction, the catalyst is preferably added to an aromatic dicarboxylic acid or a glycol at a stage before or immediately after the initiation of the ester-exchange reaction, in an amount the same as aforesaid amount as is used for the polycondensation reaction.

A half or less amount of the polycondensation catalyst used in the present invention may be replaced by any known polycondensation catalyst, for example, in antimony compound, such as antimony trioxide, a germanium compound, such as germanium dioxide and germanium tetraethoxide, a manganese compound, such as manganese acetate, and a zinc compound, such as zinc acetate, provided that the effect of the present invention is substantially maintained.

Known conventional conditions for polycondensation reactions may be adopted for forming a polyester from a glycol ester of the aromatic dicarboxylic acid and/or a low molecular weight condensate thereof in the present invention. For example, polyethylene terephthalate can be prepared by heating an ethylene glycol ester of terephthalic acid and/or the low molecular weight condensate thereof with a catalytic amount of the aforesaid polycondensation catalyst while removing ethylene glycol therefrom at a temperature between the melting point thereof and about 300° C. for from about 1 to about 4 hours at reduced pressure of from 30 to 0.1 mmHg. When the preformed titanate compound in the present invention is also used as the ester-exchange catalyst, a mixture of the lower alkyl ester of terephthalic acid and ethylene glycol containing a catalytic amount of the preformed titanate compound is heated at a temperature between about 130 and about 250° C. for from about 1 to about 4 hours at normal atmospheric pressure while removing the lower alcohol formed to complete the ester-exchange reaction, after which the obtained ethylene glycol ester of terephthalic acid and/or the low molecular weight condensate thereof is polycondensed to form polyethylene terephthalate.

In the present invention, it is possible to add a monofunctional compound, such as benzoic acid, benzylbenzoic acid, alkoxypolyalkylene glycols, salts a phenolsulfonic acid and salts of γ-hydroxypropane sulfonic acid in small quantities to the reaction mixture during the polycondensation to copolymerize the same with the terminals of the resulting polyester. It is also possible to copolymerize a trifunctional or more highly functional compound, such as glycerin, pentaerythritol or benzene tricarboxylic acid, with the resulting polyester, provided the polyester is substantially thermoplastic.

Still further, it is possible optionally add a coloring agent, such as carbon black, pigments and dyestuffs, a delustering agent, such as titanium dioxide, a fluorescent agent, a stabilizer, such as phosphorous acid, phosphoric acid or derivatives thereof, an ultraviolet ray absorbent, an ether bond proofing agent, such as lithium acetate, sodium acetate or sodium methylate, a dyeingability increasing agent, a flame retardant, or an antistatic agent to the reaction mixture at any state of the reaction.

According to the present invention, it is possible to accelerate the rate of the polycondensation reaction and, in relatively short reaction times, obtain polyesters of high molecular weight. (The preferred intrinsic viscosity [η] of the obtained polyester is from 0.60 to 0.85 when measured at 35° C. in orthochlorophenol.) The polyesters produced employing the polycondensation catalysts of the present invention have improved color tone and a higher softening point as compared to products obtained employing catalysts known in the prior art. The polycondensation catalysts of the present invention are stable for long periods of time so that they can be conveniently handled in the manufacturing process.

The present invention is more specifically illustrated in the following examples, in which parts are on a weight basis. The various physical properties mentioned in the examples are defined as follows:

1. Intrinsic Viscosity [η]

Intrinsic viscosity is measured at 35° C. in orthochlorophenol. The preferred intrinsic viscosity of the polyester is from 0.60 to 0.85.

2. Color Tone

The color tone of the obtained polyesters is expressed by L values and b values which are obtained in the following manner. The obtained polyester is melt-extruded and cut into the form of chip (4mm × 4mm × 2mm). The chips are heated at a temperature of 200° C. for 20 minutes in a nitrogen current to crystallize them. Thereafter, the color of the chips is measured using a Color Machine CM-20 type (manufactured by Color Machine Co.). L values show the lightness of the polyesters; greater L values mean the color tone is lighter, while greater b values to the positive side mean the polyester is more yellowish, and greater b values to the negative side mean the polyester is more bluish.

The preferred L value of the polyester is more than 80 and b value is less than 5.

3. Softening Point (measurement by means of a penetrometer)

After heating the obtained polyester for 1 hour at 140° C., it is molded into a piece 2mm × 2mm × 1.5mm, which is placed below a plunger loaded with 10 grams. The part of the plunger which comes into contact with the piece is of a flat circular form of a diameter of 3mm. The temperature of the piece is then raised at a rate of 1.2° C. per minute. The point at which the plunger makes a 0.5mm descent as a result of the softening of the piece is electrically detected and the temperature at this time is designated as the softening temperature (softening point). The preferred softening point of the polyester is more than 258° C.

EXAMPLES 1-3, COMPARATIVE EXAMPLES 1 AND 2

A. Preparation of Polycondensation Catalysts

A predetermined amount of trimellitic acid as shown in Table I was dissolved in 25 parts ethanol. A predetermined amount of tetra-n-butyl titanate as shown in Table I was added to the ethanol solution of trimellitic acid. The mixture was heated at a temperature of 80° C. for 60 minutes under normal atmospheric pressure to remove the n-butyl alcohol formed. After cooling, 15 parts acetone was added to the reaction mixture at room temperature to precipitate the obtained titanate compound. The precipitated titanate compound was filtered from the mother liquor and dried at a temperature of 100° C. for 2 hours. According to infrared spectrum and elementary analysis of the preformed titanate compound of Example 1, it was found that about 2 of the original substituent groups of tetra-n-butyl titanate were replaced by trimellitic acid groups.

B. Preparation of Polyesters

A reaction vessel fitted with a stirrer and a rectifying column was charged with 970 parts dimethyl terephthalate, 640 parts ethylene glycol and 0.20 parts (about 0.01 mol% calculated in terms of titanium atoms based on dimethyl terephthalate) of the preformed titanate compound obtained in A., following which an ester-exchange reaction was carried out by heating the mixture for 3 hours at 140 to 230° C. while removing 320 parts methanol formed. This was followed by adding 0.18 parts trimethyl phosphate (a stabilizer) and 4.85 parts titanium dioxide (a delustering agent) to the ester-exchange product. Thereafter, the ester-exchange product was transferred into a polycondensation vessel fitted with a stirrer and a condenser for removing ethylene glycol, following which the polycondensation reaction was carried out by heating the product for 3.5 hours raising the temperature from 230 to 285° C. under a reduced pressure of 1 mmHg.

The physical properties of the obtained pressure were as shown in Table I below.

TABLE I

| Example No. | Preformed Titanate Compounds | | | Properties Of The Obtained Polyesters | | | |
|---|---|---|---|---|---|---|---|
| | Trimellitic Acid parts (mols) | Tetra-n-butyl Titanate parts (mols) | Amount of Titanium Contained (% by weight) | [η] | Softening Point (° C) | L | b |
| Comparative Example 1 | 1.20 (6) | 0.64 (2) | 10.1 | 0.451 | 262.0 | 81.5 | 3.1 |
| Example 1 | 0.80 (4) | 0.64 (2) | 11.5 | 0.652 | 261.8 | 82.0 | 3.2 |
| Example 2 | 0.40 (2) | 0.64 (2) | 12.0 | 0.648 | 261.8 | 81.0 | 3.0 |
| Example 3 | 0.20 (1) | 0.64 (2) | 11.8 | 0.605 | 259.8 | 81.3 | 4.3 |
| Comparative Example 2 | 0.08 (0.4) | 0.64 (2) | 13.2 | 0.600 | 259.5 | 80.0 | 5.3 |

The polyesters of Examples 1–3 in the present invention had high softening points (more than 258° C.) and good color tone (L values were more than 80 and b values were less than 5). The polycondensation rates in Examples 1–3 were rapid so that the obtained polyesters had high intrinsic viscosities (more than 0.600). On the other hand, the polyester of Comparative Example 1 had a low intrinsic viscosity, which means a slow polycondensation rate was involved. The polyester of Comparative Example 2 possessed a yellow color (a 5.3 b value).

The polycondensation catalysts which were obtained by reacting trimellitic acid with tetrapropyl titanate or tetraisopropyl titanate also had excellent catalytic capacities substantially the same as the catalyst obtained from trimellitic acid and tetra-n-butyl titanate.

EXAMPLES 4–6, COMPARATIVE EXAMPLES 3–5

A. Preparation of Polycondensation Catalysts

By the same procedure as A. of Example 1, a polycondensation catalyst was produced by reacting 4 mols of an acid component as disclosed in Table II with 2 mols of tetra-n-butyl titanate.

B. Preparation of Polyesters

A reaction vessel fitted with a stirrer and a rectifying column was charged with 970 parts dimethyl terephthalate, 640 parts ethylene glycol and 0.306 parts manganese acetate tetrahydrate, following which the ester-exchange reaction was carried out by heating the mixture for 2 hours and 40 minutes raising the temperature from 140 to 230° C., while removing 320 parts methanol formed. This was followed by adding 0.238 parts trimethyl phosphate (a stabilizer), 4.85 parts titanium dioxide (a delustering agent) and 0.2 parts of the preformed titanate compound (polycondensation catalyst) obtained in A. to the ester-exchange product. The polycondensation reaction was then carried out by heating the mixture for 3.5 hours raising the temperature from 230 to 285° C. under a reduced pressure of 1 mmHg.

The physical properties of the obtained polyesters were as shown in Table II below.

TABLE II

| Example No. | Acid Component Of Preformed Titanate Compound | Properties Of The Obtained Polyester | | | |
|---|---|---|---|---|---|
| | | [η] | Softening Point (° C) | L | b |
| Example 4 | Trimellitic Anhydride | 0.651 | 261.2 | 82.0 | 2.1 |
| Example 5 | Hemimellitic Acid | 0.634 | 260.8 | 82.3 | 2.5 |
| Example 6 | Hemimellitic Anhydride | 0.635 | 261.0 | 82.0 | 2.8 |
| Comparative Example 3 | Maleic Acid | 0.652 | 261.2 | 81.2 | 12.9 |
| Comparative Example 4 | Phthalic Acid | 0.516 | 262.0 | 85.1 | 8.2 |
| Comparative Example 5 | Trimesic Acid | 0.638 | 261.0 | 81.4 | 5.6 |

The polyesters in Examples 4–6 of the present invention had high softening points and good color tone. On the other hand, the polyesters of Comparative Examples 3–5 possessed a distinctly yellow color.

COMPARATIVE EXAMPLES 6

A polyester was produced by the same procedure as B. of Example 1, except that 0.17 parts tetra-n-butyl titanate instead of the preformed titanate compound was used as an ester-exchange and polycondensation catalyst. The obtained polyester possessed a distinctly yellow color. The physical properties of the polyester were as follows:

[η] = 0.600
L value = 78.0
b value = 10.5
Softening point = 258.3° C.

EXAMPLE 7, COMPARATIVE EXAMPLE 7

A polyester was produced by the same procedure as B. of Example 1, except that a catalyst which comprised combined germanium dioxide and a preformed titanate compound (Example 7) or a titanic acid ester (Comparative Example 7) was used as an ester-exchange and polycondensation catalyst. In both Example 7-a and Comparative Example 7-a, the catalyst was immediately used after making a stock solution therein in ethylene glycol containing 1%, by weight (calculated in terms of titanium atoms) of either the preformed titanate compound or the titanic acid ester. In both Example 7-b and Comparative Example 7-b, the catalyst was used after storing each stock solution for one day.

The physical properties of the obtained polyesters were as shown in Table III below.

TABLE III

| Example No. | Catalyst (parts) | [η] | Softening Point (° C) | L | b |
|---|---|---|---|---|---|
| Example 7-a | Preformed Titanate Compound*: 1.20** | 0.661 | 258.5 | 83.7 | −0.4 |
| Example 7-b | Germanium Dioxide***: 0.16 | 0.667 | 258.5 | 83.5 | −0.2 |
| Comparative Example 70a | Tetra-n-butyl Tritanate: 0.09 | 0.662 | 257.8 | 82.3 | 2.6 |
| Comparative Example 7-b | Germanium Dioxide: 0.16 | 0.556 | 258.0 | 81.0 | 3.0 |

*A preformed titanate compound obtained from trimellitic acid and tetra-n-butyl titanate as shown in Example 1.
**Parts of ethylene glycol solution containing 1%, by weight (calculated in terms of titanium atoms) of the preformed titanate compound.
***Germanium Dioxide was added in the form of ethylene glycol slurry containing 20%, by weight of Germanium Dioxide.

The polyesters in both Examples 7-a and 7-b had high intrinsic viscosities, high softening points and good color tone. Although the polyester in Comparative Example 7-a had pretty good physical properties, the polyester in Comparative Example 7-b had a low intrinsic viscosity, which means that a titanic acid ester, such as tetra-n-butyl titanate, easily loses its catalytic capacity, resulting in difficulties in handling the same.

EXAMPLE 8

A. Preparation of Polycondensation Catalyst 51 parts (0.27 mol) trimellitic anhydride was dissolved in 500 parts ethylene glycol. 45.6 parts (0.13 mol) tetra-n-butyl titanate was added to the ethylene glycol solution of trimellitic anhydride. The mixture was heated at a temperature of 180° C. for 60 minutes at normal atmospheric pressure to remove 20 parts n-butyl alcohol formed. This means that about 2 of the original substituent groups of the tetra-n-butyl titanate were replaced by trimellitic anhydride groups. The obtained mixture was an ethylene glycol solution containing 1%, by weight (calculated in terms of titanium atoms) of the titanate compound.

A reaction vessel fitted with a stirrer and a rectifying column was charged with 970 parts dimethyl terephthalate, 640 parts ethylene glycol and 0.76 parts magnesium acetate, following which the ester-exchange reaction was carried out by heating the mixture for 3 hours raising the temperature from 140 to 230° C., while removing 320 parts methanol formed. This was following by adding 2.3 parts (0.01 mol% calculated in terms of titanium atoms based on dimethyl terephthalate) of the ethylene glycol solution of the titanate compound obtained in A., 0.426 parts phosphoric acid (a stabilizer) and 4.85 parts titanium dioxide (a delustering agent) to the ester-exchange product. The polycondensation reaction was then carried out by heating the mixture for 3.5 hours raising the temperature from 230 to 285° C.

under a reduced pressure of 1 mmHg. The physical properties of the obtained polyester were as follows:

[η] = 0.645
L value = 80.1
b value = 2.7
Softening point = 261.9° C.

EXAMPLE 9, COMPARATIVE EXAMPLE 9

A reaction vessel fitted with a stirrer and a rectifying column was charged with 110 parts terephthalic acid, 49 parts ethylene glycol and 0.01 parts triethylamine, following which esterification was carried out by heating the mixture for 3 hours and 10 minutes at 250° C. under a pressure of 3 Kg/cm²G., while removing water formed. The rate of esterification was 93% by mol based on terephthalic acid. This was followed by adding a predetermined amount of the polycondensation catalyst shown in Table IV, 0.005 parts trimethyl phosphate (a stabilizer) and 0.65 parts titanium dioxide (a delustering agent) to the esterification product. Thereafter, the reaction mixture was transferred into a polycondensation vessel fitted with a stirrer and a condenser for removing ethylene glycol, following which the polycondensation reaction was carried out by heating the mixture for 3.5 hours raising the temperature from 250 to 285° C. under a reduced pressure of 1 mmHg.

The physical properties of the obtained polyesters were as shown in Table IV below.

TABLE IV

| | Polycondensation Catalyst | | Properties Of The Obtained Polyester | | | |
|---|---|---|---|---|---|---|
| Example No. | *Preformed Titanate Compound (parts) | Antimoy Trioxide (parts) | [η] | Softening Point (° C) | L | b |
| Example 9 | 0.014** | 0.026 | 0.668 | 260.9 | 79.5 | 3.9 |
| Comparative Example 9 | 0 | 0.026 | 0.458 | 259.2 | 73.2 | 0 |

*A preformed titanate compound obtained from trimellitic acid and tetra-n-butyl titanate as shown in Example 1.
**0.005 mol% calculated in terms of titanium atoms based on terephthalic acid.

The polyester of Example 9 had a high softening point and good color tone. On the other hand, the polyester of Comparative Example 9 had a low intrinsic viscosity, which means a slow polycondensation rate.

While the invention has been described in detail and with reference to specific embodiments thereof, it will be apparent to one skilled in the art that various changes and modifications can be made therein without departing from the spirit and scope thereof.

What is claimed is:

1. In a process for the preparation of substantially linear, highly polymerized polyesters by polycondensing a glycol ester of an aromatic dicarboxylic acid and/or a low molecular weight condensate thereof while removing glycol therefrom in the presence of a polycondensation catalyst, the improvement which comprises using as the polycondensation catalyst a preformed titanate compound obtained by reacting a titanic acid ester represented by the formula $Ti(OR)_4$, where R is an alkyl group having from 1 to 5 carbon atoms, with an aromatic acid selected from the group consisting of trimellitic acid, trimellitic anhydride, hemimellitic acid, hemimellitic anhydride or a mixture of one or more thereof at a molar ratio of from about 0.5 to about 2.5 mols of the aromatic acid per 1 mol of the titanic acid ester.

2. The process according to claim 1 wherein the titanic acid ester is a member selected from the group consisting of tetrapropyl titanate, tetraisopropyl titanate and the tetrabutyl titanates.

3. The process according to claim 1 wherein the preformed titanate compound is obtained by reacting the titanic acid ester with the aromatic acid at a molar ratio of from 1 to 2 mols of the aromatic acid per 1 mol of the titanic acid ester.

4. The process according to claim 1 wherein the preformed titanate compound is used as the polycondensation catalyst in an amount of from 0.001 to 0.5 mol% (calculated in terms of titanium atoms) based on the aromatic dicarboxylic acid.

5. The process according to claim 4 wherein the preformed titanate compound is used in an amount of 0.005 to 0.02 mol%.

* * * * *